United States Patent
Van Beek et al.

(10) Patent No.: US 7,211,281 B2
(45) Date of Patent: May 1, 2007

(54) METHOD FOR IMPROVING THE ACTIVITY OF ENZYMES

(75) Inventors: Eddy Van Beek, Geel (BE); Ingrid Somers, Turnhout (BE); Eric Peys, Balen (BE); Benedikt Sas, Oud-Turnhout (BE)

(73) Assignee: Kemin Industries, Inc., Des Moines, IA (US)

( * ) Notice: Subject to any disclaimer, the term of this patent is extended or adjusted under 35 U.S.C. 154(b) by 529 days.

(21) Appl. No.: 09/753,381

(22) Filed: Jan. 2, 2001

(65) Prior Publication Data

US 2001/0046693 A1 Nov. 29, 2001

Related U.S. Application Data

(60) Provisional application No. 60/173,945, filed on Dec. 30, 1999.

(51) Int. Cl.
*A23K 1/14* (2006.01)
*A23K 1/165* (2006.01)

(52) U.S. Cl. ............... 426/53; 435/189; 424/94.3; 424/94.6

(58) Field of Classification Search ............ 426/53; 435/189; 424/94.3, 94.6
See application file for complete search history.

(56) References Cited

U.S. PATENT DOCUMENTS 5,514,404 A * 5/1996 Zimmerman ............ 426/549
5,612,055 A * 3/1997 Bedford .................. 424/442
5,759,537 A    6/1998 Garnett

FOREIGN PATENT DOCUMENTS

| DE | 3405208 | * | 8/1984 |
| EP | 292052 | * | 11/1988 |
| EP | 0619079 B1 | | 4/1994 |
| EP | 0743017 A2 | | 5/1996 |
| JP | 62285749 | * | 12/1987 |

OTHER PUBLICATIONS

Baisted et al., Phytochemistry (Elsevier) (1981), 20(5), 985-8.*
B. Sas et al., Efficient Method for (Lyso) Phospholipid Class Separation by High Performance Liquid Chromatography Using an Evaporative Light-Scattering Detector, 864 J. Chromatography A 179 (1999).

* cited by examiner

*Primary Examiner*—Irene Marx
(74) *Attorney, Agent, or Firm*—Kent A. Herink; Emily E. Harris; Daniel A. Rosenberg

(57) ABSTRACT

A method for improving the performance of enzymes used in animal feeds by the use of surfactants. Lecithin and/or lysolecithin is added to an animal feed including an exogenous enzyme to boost the performance of the enzyme so that a desired level of performance can be maintained while reducing the amount of exogenous enzyme that must be included in the animal feed. Preferably, the surfactant includes lyso-forms of lecithin.

9 Claims, No Drawings

METHOD FOR IMPROVING THE ACTIVITY OF ENZYMES

This application claims the benefit of U.S. Provisional Application No. 60/173,945, filed Dec. 30, 1999.

BACKGROUND OF THE INVENTION

1. Field of the Invention

The invention relates generally to a method for reducing the amount of enzymes required when used in animal feeds and animal feed ingredients and, more specifically, to the use of lecithin or lysolecithin and, optionally, a protease, to improve the activity of enzymes added to enhance the properties of the animal feeds or animal feed ingredients.

2. Background of the Prior Art

In the EPO Application EP 0 743 017 A2, entitled "Application of phospholipases in animal feed," there is described a process for improving the efficiency of feed utilization and/or for promoting the growth of animals fed a diet which comprises a composition of a feed substance and a ready for use phospholipase additive. The preferred phospholipid is lecithin and the preferred phospholipase is mammalian phospholipase A2.

The EPO Patent EP 0 619 079 B1, entitled "Feed additives for ruminants," teaches a feed additive for ruminants in which biologically active substances are coated with a composition that is stable in the rumen and allows for the release of the biologically active substance in the post-abomasum digestive organs. Included in the biologically active substances is lipase, phospholipase, esterase, and so on.

U.S. Pat. No. 5,759,537 discloses an animal feedstuff which contains a minor amount of a lysophospholipid that has growth promoting properties when fed to animals.

The use of enzymes in feed formulations for animals, particularly poultry, is a well-accepted practice in today's highly specialized animal production industry. Enzymes have been used to improve the nutritional value of feed formulations that have high inclusion levels of small grain cereals such as wheat and barley, in addition to high fiber material such as sunflower, rape seed, peas and beans.

There is also evidence that multiple enzyme combinations have a greater efficacy than individual enzymes. Given the many biochemical processes involved in the animals' ability to digest nutrients, it may be expected that a multiple enzyme system would play a more comprehensive role in digestion. The variation in the overall content and bioavailability of carbohydrates, fats, proteins, and amino acids in these substrates has led to the formulation of various enzymes designed to liberate otherwise unavailable nutrients.

Many enzymes are, unfortunately, expensive. Substantial savings could be realized if a method was developed that would increase the activity or effectiveness of the exogenous enzymes added to animal feed so that the desired level of efficacy could be maintained while the inclusion level of the enzyme was reduced. The present invention adds a biosurfactant, specifically lecithin and/or lysolecithin, to animal feed formulations to boost the effect of exogenous enzymes and thereby reduce the level of such enzymes that must be added to the feed while maintaining the effectiveness of the enzymes in improved performance of the animal or in maintaining performance of the animal while increasing the amount of less expensive feed ingredients that contain anti-nutritive factors.

SUMMARY OF THE INVENTION

The invention consists of the use of enzymes, such as α-amylase, β-galactosidase, β-glucanase, cellulase, lipase, and xylanase, and combinations of such enzymes in liquid or dry form, in combination with lecithin and/or lysolecithin and, optionally, a protease, to improve the activity of the enzymes or combination of enzymes in breaking down animal feeds or animal feed ingredients to increase the nutrients available to the animal from the animal feeds or animal feed ingredients. Surprisingly, when the lysophospholipid/phospholipid-type of surfactants are used, a reduction of up to 50% of the enzymes used in the feed can be made without a degradation in the desired effect of the enzymes. Addition of the protease further enhances the increased activity of the enzymes.

DETAILED DESCRIPTION OF A PREFERRED EMBODIMENT

The activity of enzymes is expressed in enzyme activity units. Exemplary procedures for the determination of the enzyme activity of α-amylase, β-glucanase, cellulase, protease, and xylanase are as follows:

Alpha-amylase—Unit definition: the amount of enzyme catalyzing the hydrolysis of 1 micromol glucosidic linkage per minute at 37° C. The enzyme is reacted with a substrate consisting of a cross-linked, insoluble, blue-colored starch polymer that has been mixed with bovine serum albumin and buffer and then tableted. The starch is hydrolyzed by the enzyme, giving soluble blue fragments that are quantified by measurement of absorbance at 620 nm.

Protease—Unit definition: the quantity of enzyme that solubilizes 1 microgram of azo-casein per minute. The enzyme is reacted with a substrate consisting of an azo-dyed casein. The azo-casein is hydrolyzed by the enzyme, releasing dye fragments into solution that can be quantified by measurement of absorbance at 440 nm.

Xylanase—Unit definition: the amount of enzyme that liberates 1 micromol of xylose equivalents per minute. The enzyme is reacted with birchwood xylan substrate, releasing reducing sugars that are measured using the Somogyi-Nelson method at 540 nm.

Beta-glucanase—Unit definition: the amount of enzyme that liberates 1 micromol of glucose equivalent per minute. The enzyme is reacted with medium viscosity barley beta-glucan, releasing reducing sugars that are measured using the Somogyi-Nelson method at 540 nm.

Cellulase—Unit definition: the amount of enzyme that liberates 1 micromol of glucose equivalent per minute. The enzyme is reacted with medium viscosity carboxymethylcellulose, releasing reducing sugars that are measured using the Somogyi-Nelson method at 540 nm.

A number of formulations of enzymes were used in the experiments. The formulations have the enzyme activities as set out below:

ENZ-Maize: 500 units/g xylanase; 3300 units/g beta-glucanase; 3800 units/g cellulase; 850 units/g alpha-amylase; 20,000 units/g protease; and 50 milli-units/g lipase.

ENZ-Wheat: 50,000 units/g xylanase; 3600 units/g beta-glucanase; 11,000 units/g cellulase; 850 units/g alpha-amylase; 10,000 units/g protease; and 50 milli-units/g lipase.

ENZ-Xylanase: 60,000 units/g xylanase; 3500 units/g beta-glucanase; 10,000 units/g cellulase; 600 units/g alpha-amylase; 2700 units/g protease; and 100 milli-units/g lipase.

ENZ-Barley: 100 units/g xylanase; 6500 units/g beta-glucanase; 7600 units/g cellulase; 1700 units/g alpha-amylase; 1300 units/g protease; and 100 milli-units/g lipase.

The surfactants used are lecithin and/or lysolecithin. Specifically, two sources of lecithin and/or lysolecithin were used. Lysoprin is the name of a product sold commercially by Lovesgrove Research Ltd., UK. Lysoprin is a crude lecithin that, by means of a phospholipae A2 treatment, is enzymatically enriched in lysophosphatidylcholine (LPC). Bolec MT is the name of a product sold commercially by Unimills, B.V., The Netherlands. It is very similar to Lysoprin except that Bolec MT has an additional hydrolysis of phosphatidic acid and phosphatidyletholamine into their lyso-forms and a slightly higher concentration of phosphatidylinositol and phosphatidylcholine as determined by a comparison of the HPLC separation patterns of the two products. Lysoprin and Bolec MT were determined to have approximately 33% lysophospholipids when analyzed using the method described in Sas, B., Peys, E. and Helsen, M. 1999. Efficient method for (lyso)phospholipid class separation by high-performance liquid chromatography using an evaporative light-scattering detector. *J. Chromatography A*, 864:1:179–182.

To determine the effect on enzyme activity of the surfactant and surfactant/protease systems of the present invention, both in vitro and in vivo tests were run.

In Vitro Assays

Animal trials are labor intensive and time consuming. In order to predict results in animal trials an in vitro assay method is developed which measures the effect of the enzymes and the enzymes combined with the surfactants and protease of the present invention on the Neutral Detergent Fiber (NDF) of the animal feed or animal feed ingredient. The method is based on using the animal feed which is proposed for use in the animal trial. To have a standardized method, the NDF fraction from the complex feed substrate is used. NDF degradability is measured in the presence of enzyme products and combinations of enzymes with various combinations and levels of the surfactant and surfactant/protease systems to look for increases in the enzyme activity. The goal is to modify the surfactant and surfactant/protease systems in such a way that the best score is obtained in the degradability of the NDF fraction.

As used in this application, NDF terminology is used according to Van Soest fiber determinations.

Protocol

For determination of NDF of feeds and measuring the effect of enzymes on this extracted portion we followed two procedures which are set out below, namely, the determination of NDF in feeds and feed raw materials, and the measuring the effect of enzymes on NDF in feeds and feed raw materials.

Determination of NDF in Feeds and Feed Raw Materials

In the following method of determining the NDF in feeds and feed raw materials, a phosphate buffer and a neutral detergent (ND) reagent are used. To prepare the phosphate buffer, dissolve 11.876 g $Na_2HPO_4$ in 1 liter of distilled water (solution A) and dissolve 9.078 g of $KH_2PO_4$ in 1 liter distilled water (solution B). Combine 600 ml of solution A and 400 ml of solution B and dilute to 10 liters with distilled water. The pH of the solution is checked and adjusted to 7.0 (+0.1) with NaOH or HCl if necessary. Before use, the phosphate buffer is heated to 40° C. The ND reagent is made by dissolving separately in distilled water 186.1 g $Na_2EDTA-2H_2O$ (or 146.1 g EDTA (free acid) and 40.0 g NaOH); 270.0 g sodium lauryl sulfate; 68.1 g $Na_2B_4O_7.10H_2O$; and 57.2 g $Na_2HPO_4.2H_2O$. The four prepared solutions are combined and 100.0 ml 2-ethoxy ethanol is added. The pH of the solution is checked and adjusted to 7.0 (±0.1) with NaOH or HCl if necessary. The final volume is adjusted to 10 liters with distilled water.

A feed sample is prepared by grinding until it passes through a 1 mm sieve. A 1 g sample is weighed out and placed in a filter crucible. If the feed sample contains a significant amount of fat, it is washed three times with acetone using a Buchner flask and then dried for at least 16 hrs at room temperature or for 30 min at 50° C. The crucible is placed in a Dosifibre-Tecator machine (Foss) and 100 ml of the ND reagent heated to 90° C. is added. The heating element of the Dosifibre-Tecator machine is turned on, and the timer is started when the solution is boiling in three of the six chambers. When the reagent starts boiling, 0.25 ml Thermamyl 120 L (NovoNordisk) is added. The reagent is kept at boiling for one hour. If foaming is a problem, a small amount of 2-octanol is added. After one hour has passed, the reagent is pumped off and the residue is washed in hot water at least five times.

Thirty ml of the phosphate buffer (40° C.) is added to the residue together with 1 ml Thermamyl 120 L and 0.25 ml Alcalase (NovoNordisk). Another 30 ml of the phosphate buffer is added to ensure adequate mixing. The solution is incubated at 40° C. for 15 minutes while air is bubbled through the sample approximately every three minutes. The buffer is then removed and the residue is washed three times with hot distilled water and then three times with acetone. The crucible is then placed in a drying oven (104° C.) for at least 4 hours (if the crucible is dried for more than 8 hours, the step of washing with acetone can be omitted). The crucible is then allowed to cool in a dessicator for approximately one hour and then weighed. The crucible is then transferred to a muffle furnace set at 550° C. for two hours. The furnace is opened and the crucible allowed to cool until it is approximately 150° C. whereupon it is transferred to the dessicator to cool to room temperature and then weighed again.

The NDF is determined by the following formula:

$$\%NDF = \frac{\text{weight after drying} - \text{weight after ashing}}{\text{weight of sample}} \times 100$$

Measuring the Effect of Enzymes on the NDF in Feeds and Feed Ingredients

In the following method of measuring the effect of enzymes on the NDF in feeds and feed ingredients, an acetate buffer is needed in addition to the phosphate buffer and ND reagent described above. The acetate buffer is prepared by dissolving 7.900 g sodium acetate ($NaC_2H_3O_2.2H_2O$) in 950 ml of distilled water. The pH is adjusted using glacial acetic acid to a pH of 4.8.

A feed sample is prepared by grinding until it passes through a 1 mm sieve. A 1 g sample is weighed out and placed in a filter crucible. If the feed sample contains a significant amount of fat, it is washed three times with acetone using a Buchner flask and then dried for at least 16 hrs at room temperature or for 30 min at 50° C. One half gram (0.5 g) of the feed sample is weighed and placed in a 1100 ml beaker, and 30 ml of the acetate buffer is added. The beaker is placed on a magnetic stirrer and stirred. A filter crucible (Por 1) is added to the beaker and 10 ml of the acetate buffer is added to the crucible. The beaker and crucible are incubated, together with the enzyme product solutions and combinations of enzyme products with the phospholipid/lysophopholipid-type surfactants, as indicated, for 4 hrs at 37° C.

The crucible is placed in a Dosifibre-Tecator machine (Foss) and the buffer is removed and washed with hot distilled water, then 100 ml of the ND reagent heated to 90° C. is added. The heating element of the Dosifibre-Tecator machine is turned on, and the timer is started when the solution is boiling in three of the six chambers. When the reagent starts boiling, 0.25 ml Thermamyl 120 L (NovoNordisk) is added. The reagent is kept at boiling for one hour. If foaming is a problem, a small amount of 2-octanol is added. After one hour has passed, the reagent is pumped off and the residue is washed in hot water at least five times.

The feed in this study used is a broiler feed based containing 39.0% corn (maize), 20.0% wheat, 17.0% soybean meal 48, 8.7% sunflower meal, 5% animal meal, 5% peas, 3.2% added fat and vitamin/mineral premix.

Results and Discussion

In Tables 1 and 2, results are shown as percentage NDF which were present in control samples and feed samples treated with enzyme products and combinations of enzyme products with lysophospholipid/phospholipid type (LPC/PC-type) of surfactants. Incubations of those products were done according to the method described above.

Conclusions

The results show that when enzyme products are combined with LPC/PC-type of surfactants NDF-degradability is improved, that a surplus of protease gives an improvement in NDF-degradability, and that the results can vary depending on the particular enzyme product used. The in vitro assay could be used to optimize the enzyme system.

When a standard enzyme product is supplemented with surplus protease, NDF-degradability is improved, that this surplus of protease enzyme activity is helping in the boosting effect when the enzyme product is combined with the LPC/PC-type of surfactant, and that the S2 surfactant, which contains lyso-forms, is better than the crude lecithin product of S1.

The same amount of NDF-degradability can be obtained when 50% of the enzyme product is substituted with the LPC/LP-type of surfactant, the protease enzyme activity is important for the boosting effect of the final combination product (enzymes+surfactant), and the surplus protease enzyme on its own is not giving the extra benefit in the NDF-degradability.

The results also indicate that further improvements can be achieved by choosing the best LPC/LP-type of surfactant, which in this case is the fully converted product, S4.

TABLE 1

The effect of different enzymes and combinations of enzymes and surfactants on Neutral Detergent Fiber (NDF)-breakdown

| | Enzyme | Surfactant | Protease | Percent NDF remaining |
|---|---|---|---|---|
| Control | | | | 100% |
| Avizyme[1] 1500 | 500 Kg/T | | | 88.95% |
| Quatrazyme[2] | 500 Kg/T | | | 94.00% |

TABLE 1-continued

The effect of different enzymes and combinations of enzymes and surfactants on Neutral Detergent Fiber (NDF)-breakdown

| | Enzyme | Surfactant | Protease | Percent NDF remaining |
|---|---|---|---|---|
| ENZ-Xylanase | 500 Kg/T | | | 92.55% |
| ENZ-Xylanase | 500 Kg/T | | 5 Kg/T | 91.66% |
| ENZ-Xylanase/S2[3] | 250 Kg/T | 250 Kg/T | | 94.44% |
| ENZ-Xylanase/S2 | 250 Kg/T | 250 Kg/T | 5 Kg/T | 88.38% |
| ENZ-Xylanase/S2 | 250 Kg/T | 250 Kg/T | 5 Kg/T | 86.14% |
| ENZ-Barley | 500 Kg/T | | 5 Kg/T | 94.32% |
| ENZ-Barley/S2 | 250 Kg/T | 250 Kg/T | 5 Kg/T | 91.95% |

[1]FinnFeed, a division of Danisco, Denmark
[2]Endo 1,4 β xylanase and endo-1,3(4) β glucanase produced by *Aspergillus niger* CNCM I-517
[3]Biosurfactant product containing approx. 16% Lysoprin by weight

TABLE 2

The effect of different enzymes and combinations of enzymes and surfactants on Neutral Detergent Fiber (NDF)-breakdown.

| | Enzyme | Surfactant | Protease | Percent NDF remaining |
|---|---|---|---|---|
| Control | | | | 100.00% |
| ENZ-Xylanase | 500 Kg/T | | | 94.75% |
| ENZ-Xylanase | 500 Kg/T | | 5 Kg/T | 93.79% |
| ENZ-Xylanase/S2[1] | 250 Kg/T | 250 Kg/T | | 98.84% |
| ENZ-Xylanase/S1[2] | 250 Kg/T | 250 Kg/T | | 97.29% |
| ENZ-Xylanase/S2 | 250 Kg/T | 250 Kg/T | 5 Kg/T | 91.01% |
| ENZ-Xylanase/S1 | 250 Kg/T | 250 Kg/T | 5 Kg/T | 95.77% |
| ENZ-Xylanase/S3[3] | 250 Kg/T | 250 Kg/T | 5 Kg/T | 89.80% |
| ENZ-Xylanase/Tween[4] 80 (0.5%) | 250 Kg/T | | 5 Kg/T | 97.11% |
| ENZ-Xylanase/S1/Tween 80 (0.5%) | 250 Kg/T | 250 Kg/T | 5 Kg/T | 92.19% |
| ENZ-Xylanase/S4[5] | 250 Kg/T | 250 Kg/T | 5 Kg/T | 89.28% |
| ENZ-Barley | 500 Kg/T | | 5 Kg/T | 94.90% |
| ENZ-Barley/S2 | 250 Kg/T | 250 Kg/T | 5 Kg/T | 94.90% |
| Protease | | | 5 Kg/T | 97.00% |
| ENZ-Xylanase/S2 | 250 Kg/T | 250 Kg/T | 0.5 Kg/T | 96.60% |
| ENZ-Xylanase/S2 | 250 Kg/T | 250 Kg/T | 2.5 Kg/T | 94.10% |
| ENZ-Xylanase/S2 | 250 Kg/T | 250 Kg/T | 5 Kg/T | 93.50% |

[1]Biosurfactant product containing approx. 16% Lysoprin by weight
[2]Crude lecithin-type surfactant derived from soybeans containing approx. 16% lecithin by weight
[3]Biosurfactant product containing approx. 16% Bolec MT by weight
[4]A widely available edible fatty acid-type emulsifier available from Zeneca
[5]Biosurfactant product containing approx. 16% lysolecithin (U.S. Pat. No. 6,068,997) by weight In Vivo (Field) Trials In a research farm, broiler trials were set up in order to verify the effect of enzyme products without and with a boosting factor of the present invention. The goal of the field trials was to boost the enzyme activity, resulting in an improvement in animal performance. Another goal is to test if a reduced diet energy level can be matched up when an enzyme product is added to a negative control diet.

EXPERIMENT 1

Materials and Methods

The positive control diet is chosen to have 3150 kcal metabolizable energy. This diet consists of 36.6% corn (maize), 20.0% wheat, 25.1% soybean meal 48, 5% animal meal, 5% added fat, 3% peas, 3% sunflower meal 28 and vitamin/mineral premix. The negative control diet is chosen to have 3000 kcal metabolizable energy. This diet consists of 39.0% corn (maize), 20.0% wheat, 17.0% soy bean meal 48, 8.7% sunflower meal, 5% animal meal, 5% peas, 3.2% added fat and vitamin/mineral premix.

The broiler trial is conducted in metabolic cages using Ross breed birds from day 14 to day 28. The trials were conducted during periods in September through December and April through June. For each test group, 36 replicates are done in order to achieve statistically significant differences. Daily feed intake, daily growth and feed conversion rate (FCR) are measured. Initial weights (14 days) are compared with final weights (28 days).

Results and Discussion

Results shown in Table 3 demonstrate that when enzyme products are improved with a boosting factor animal performance is better than the negative control group and at least similar to the enzyme product. It is important is to note that the final product, which contains a boosting factor, has only 50% of the enzyme activity strength.

TABLE 3

| Growth parameters | + control | − control | E1 | E2 | E3 | E4 |
|---|---|---|---|---|---|---|
| Weight d14 (g) | 240 | 241 | 241 | 243 | 241 | 242 |
| Weight d28 (g) | 938 | 847 | 853 | 878 | 863 | 865 |
| Daily growth (g) | 49.7 | 43.2 | 43.6 | 45.4 | 44.3 | 44.5 |
| Daily feed intake (g) | 86.7 | 82.6 | 84.8 | 84.0 | 83.4 | 83.4 |
| FCR | 1.74 | 1.94 | 1.95 | 1.87 | 1.89 | 1.90 |

E1 = 100% ENZ-Barley and 1% additional protease
E2 = 50% ENZ-Barley and extra protease and 50% of a biosurfactant product containing approx. 16% Lysoprin by weight
E3 = 100% ENZ-Xylanase and 1% additional protease
E4 = 50% ENZ-Xylanase and extra protease and 50% of a biosurfactant product containing approx. 16% Lysoprin by weight

EXPERIMENT 2

An experiment was conducted to study the bioefficacy of the enzyme preparations ENZ-Maize and ENZ-Wheat in broiler diets based on maize and wheat, respectively. Two thousand two hundred and forty (2240) sexed broiler chickens of the Ross 308 strain were used. There were 7 experimental treatments: M-0: maize diet without additives; M-1: maize diet with ENZ-Maize at 500 g/t; M-2: maize diet with ENZ-Maize at 1000 g/t; W-0: wheat diet without additives; W-1: wheat diet with ENZ-Wheat at 500 g/t; W-2: wheat diet with ENZ-Wheat at 1000 g/t; W-3: wheat diet with ENZ-Wheat at 500 g/t+Acid LAC® (a feed acidifier containing a mixture of organic acids available commercially from Kemin Industries, Inc., Des Moines, Iowa, U.S.A.) at 3 kg/t. Performance and breast yield were measured after 36 days.

Methodology

The chickens were distributed into 52 pens, each pen measuring 4 m². The pens are located in the floor pen house of the farm. Stocking density was 10 chickens/m², or 40 chickens per pen. In order to distribute equally the influence of the parent stock, they were distributed in such a way that each pen received the same number of chickens from a single box.

The houses are provided with artificial programmable lights, automated gas heating and forced ventilation by depression. Temperature inside the houses on arrival was 33–35° C. and was decreased by 3° C. each week. The lighting program was 23 hours of light the first four days, 20 hours of light until 10 days, and 18 hours of light afterwards.

Two thousand two hundred and forty (2240) sexed broiler chickens of the Ross 308 strain were used. Only animals free of any clinical signs, e.g. no leg problems, eyes opened, active behavior, and no other problems, were included in the trial. They were purchased from Granja CRUSVI, Reus, Spain. They were distributed by sex into 56 pens. Males were allocated on one side of the house and females in the other, so that location and sex were confounded.

Feeding Program
There were 3 diets:
Starter until 21 days of age
Finisher until 5 days before slaughter
Withdrawal until slaughter.

Nicarbazin was used as coccidiostat in the starter diet and Monensin in the finisher diet. The starter diet was given in mash form and 3 mm pellets were gradually introduced during the first week. The finisher and withdrawal diets were given in 4 mm pellets. Feeds were prepared in the feedmill of the Centre Mas Bove. Temperature in the conditioner was adjusted to 65° C. The composition of the basal diets are set out in Table 3.

TABLE 3

| | Composition of the basal diets | | | |
|---|---|---|---|---|
| | Maize | | Wheat | |
| Ingredient | Starter | Finisher & withdrawal[1] | Starter | Finisher & withdrawal[1] |
| Maize | 49.284 | 52.602 | | |
| Wheat | 5.000 | 5.000 | 55.000 | 55.000 |
| Lard | 3.000 | 3.000 | 3.000 | 3.000 |
| Manioc | | | | 4.710 |
| Full-fat extruded soybeans | 9.679 | 14.026 | 22.299 | 26.616 |
| Soybean meal, 47% protein | 29.448 | 22.306 | 16.102 | 7.576 |
| DL-methionine | 0.291 | 0.266 | 0.288 | 0.277 |
| L-lysine HCl | | | 0.026 | 0.079 |
| Calcium carbonate | 0.689 | 0.607 | 0.535 | 0.406 |
| Dicalcium phosphate | 1.656 | 1.403 | 1.842 | 1.611 |
| Salt | 0.446 | 0.347 | 0.450 | 0.325 |
| Minerals and vitamins[2] | 0.400 | 0.400 | 0.400 | 0.400 |
| Choline chloride | 0.107 | 0.042 | 0.058 | |
| Nicarbazin, | 125 | | 125 | |
| Monensin mg/kg | | 100 | | 100 |
| Estimated nutrient content | | | | |
| Metabolizable energy, kcal/kg | 3094 | 3197 | 3140 | 3235 |
| Crude protein | 22.4 | 20.9 | 22.8 | 20.5 |
| Crude fiber | 2.5 | 2.6 | 2.8 | 3.0 |
| Crude fat | 7.0 | 7.8 | 8.5 | 9.2 |
| Lysine | 1.24 | 1.13 | 1.22 | 1.10 |
| Methionine + cystine | 1.03 | 0.96 | 1.05 | 0.97 |
| Threonine | 0.85 | 0.79 | 0.83 | 0.74 |

[1]The withdrawal feed will be identical to the finisher, except that it will not contain Monensin.
[2]One kg of feed contains: Vitamin A, 12000 UI; Vitamin $D_3$, 2400 UI; Vitamin E, 30 mg; Vitamin $K_3$, 3 mg; Vitamin $B_1$, 2.2 mg; Vitamin $B_2$, 8 mg; Vitamin $B_6$, 5 mg; Vitamin $B_{12}$, 11 μg; Folic acid, 1.5 mg; Biotin, 150 μg; Calcium pantotenate, 25 mg; nicotinic acid, 65 mg; Mn, 60 mg; Zn, 40 mg; I, 0.33 mg; Fe, 80 mg; Cu, 8 mg; Se, 0.15 mg; Ethoxyquin, 150 mg.

Treatments and Experimental Design
There were 7 experimental treatments:
M-O: maize diet without additives
M-1 maize diet with ENZ-Maize at 500 g/t M-2: maize diet with ENZ-Maize at 1000 g/t
W-0: wheat diet without additives
W-1: wheat diet with ENZ-Wheat at 500 g/t
W-2: wheat diet with ENZ-Wheat at 1000 g/t
W-3: wheat diet with ENZ-Wheat at 500 g/t+Acid LAC® at 3 kg/t.

Controls

Animals were weighed in bulk on arrival, at 21 days of age, coinciding with the change of feed, and at the end of the experiment. Average daily gain, average daily feed, and feed to gain were calculated for each period and for the overall experiment. Mortality was recorded. At the end of the experiment, 4 chicks per replicate were leg-banded for identification, individually weighed, slaughtered separately and percent breast meat determined.

Statistical Survey

There were 4 replicates of males and 4 replicates of females per treatment. The experiment was analyzed as a Randomized Complete Block Design with 8 blocks and 7 treatments. Treatment means within each type of diet are compared by a set of linear contrasts testing the following hypotheses:

Response to ENZ-Maize: M-0 vs M-1 and M-2
Response to level of ENZ-Maize: M-1 vs M-2
Response to ENZ-Wheat: W-0 vs W-1, W-2 and W-3
Response to level of ENZ-Wheat: W-1 vs W-2
Response to Acid LAC: W-I vs W-3
Can Acid LAC elicit the same response as high level of ENZ-Wheat: W-2 vs W-3

Breast weight was analyzed considering the pen as the experimental unit. The possible effect of the operator was introduced in the model as a blocking variable. Percent breast was also analyzed with live body weight as a covariable, in order to take into account the effect of body weight on breast yield.

Results and Discussion

Performance during the starter period is shown in Table 4. There were no significant differences between the control maize diet and the two diets containing ENZ-Maize (P>0.05). However, there was a significant difference between the low and high level of ENZ-Maize in feed conversion, in favor of the low level. In the wheat diet, there was a gradual response to enzyme supplementation in terms of weight gain and feed conversion. There were no significant differences between the diet containing Acid LAC (W-3) and those containing only enzyme (P>0.05) although the trend was in the direction of improving daily gain and feed efficiency with respect to the diet containing the same level of enzyme (W-2).

TABLE 4

Performance during starter period[1]

| Treatment | Initial Weight | Final Weight | Average Daily Gain | Average Daily Feed | Feed/Gain | Mortality |
|---|---|---|---|---|---|---|
| M-0: maize diet without additives | 41.3 | 694 | 31.1 | 43.7 | 1.409 | 0 |
| M-1: ENZ-Maize at 500 g/t | 41.3 | 712 | 32.0 | 43.6 | 1.364 | 0 |
| M-1: ENZ-Maize at 1000 g/t | 41.3 | 685 | 30.7 | 43.2 | 1.411 | 0 |
| W-0: wheat diet without additives | 41.3 | 618 | 27.5 | 41.6 | 1.514 | 0 |
| W-1: ENZ-Wheat at 500 g/t | 41.3 | 644 | 28.7 | 41.8 | 1.457 | 0 |
| W-1: ENZ-Wheat at 1000 g/t | 41.3 | 678 | 30.3 | 41.7 | 1.374 | 0.94 |
| W-3: ENZ-Wheat at 500 g/t + Acid LAC at 3 kg/t | 41.3 | 678 | 30.3 | 42.7 | 1.408 | 0.31 |
| Pooled std error | | 6.9 | 0.33 | 0.82 | 0.0281 | 0.279 |
| | | | P>T | | | |
| M-0 vs M-1 and M-2 | | 0.59 | 0.59 | 0.74 | 0.54 | 1.0 |
| M-1 vs M-2 | | 0.007 | 0.007 | 0.73 | 0.25 | 1.0 |
| W-0 vs W-1, W-2, and W-3 | | 0.0001 | 0.0001 | 0.68 | 0.003 | 0.18 |
| W-1 vs W-2 | | 0.001 | 0.001 | 0.94 | 0.044 | 0.024 |
| W-1 vs W-3 | | 0.001 | 0.001 | 0.43 | 0.23 | 0.34 |
| W-2 vs W-3 | | 0.99 | 0.99 | 0.39 | 0.40 | 0.18 |

[1]Values are means and standard errors of 8 replicates of 40 chickens per treatment Performance during the finisher period is shown in Table 5. There were no significant differences in any productive parameters in the maize diets (P>0.05). In the wheat diets, enzyme supplementation gradually improved average daily gain and feed conversion (P<0.05). The high level of ENZ-Wheat resulted in better daily gain and feed conversion than the low level (P<0.05). The presence of Acid LAC (W-3) caused a significant increase in daily gain with respect to the same level of enzyme without Acid LAC (W-1) but feed conversion was better (P<0.05) for the diet containing the high level of ENZ-Wheat (W-2) than for the diet containing Acid LAC (W-3).

TABLE 5

Performance during finisher period[1]

| Treatment | Initial Weight | Final Weight | Average Daily Gain | Average Daily Feed | Feed/Gain | Mortality |
|---|---|---|---|---|---|---|
| M-0: maize diet without additives | 694 | 1889 | 79.7 | 136.7 | 1.722 | 0.63 |
| M-1: ENZ-Maize at 500 g/t | 712 | 1911 | 79.9 | 136.6 | 1.715 | 1.25 |
| M-1: ENZ-Maize at 1000 g/t | 685 | 1886 | 80.1 | 135.4 | 1.697 | 0.31 |
| W-0: wheat diet without additives | 618 | 1707 | 72.6 | 133.5 | 1.844 | 0 |
| W-1: ENZ-Wheat at 500 g/t | 644 | 1761 | 74.5 | 134.6 | 1.812 | 0.95 |
| W-1: ENZ-Wheat at 1000 g/t | 678 | 1850 | 78.1 | 135.5 | 1.740 | 0 |
| W-3: ENZ-Wheat at 500 g/t + Acid LAC at 3 kg/t | 678 | 1849 | 78.1 | 140.1 | 1.804 | 0.94 |
| Pooled std error | 6.9 | 16.1 | 0.78 | 1.48 | 0.0130 | 0.40 |
| | | | P>T | | | |
| M-0 vs M-1 and M-2 | 0.59 | 0.65 | 0.76 | 0.70 | 0.34 | 0.88 |
| M-1 vs M-2 | 0.007 | 0.27 | 0.90 | 0.58 | 0.35 | 0.13 |
| W-0 vs W-1, W-2, and W-3 | 0.0001 | 0.0001 | 0.0001 | 0.064 | 0.0003 | 0.17 |
| W-1 vs W-2 | 0.001 | 0.0003 | 0.002 | 0.67 | 0.0003 | 0.13 |
| W-1 vs W-3 | 0.001 | 0.0004 | 0.002 | 0.012 | 0.66 | 0.72 |
| W-2 vs W-3 | 0.99 | 0.95 | 0.95 | 0.034 | 0.001 | 0.065 |

[1]Values are means and standard errors of 8 replicates of 40 chickens per treatment Performance in the overall experiment is shown in Table 6. There were no significant differences in performance between the treatments of the maize diets (P>0.05). In the wheat diets, enzyme supplementation gradually and significantly improved daily gain and feed conversion (P<0.05). The high level of ENZ-Wheat resulted in better daily gain and feed conversion than the low level (P<0.05). The presence of Acid LAC (W-3) caused a significant increase in daily gain with respect to the same level of enzyme without Acid LAC (W-1) but feed conversion was better (P<0.05) for the diet containing the high level of ENZ-Wheat (W-2) than for the diet containing Acid LAC (W-3).

TABLE 6

Performance in the overall experiment[1]

| Treatment | Initial Weight | Final Weight | Average Daily Gain | Average Daily Feed | Feed/Gain | Mortality |
|---|---|---|---|---|---|---|
| M-0: maize diet without additives | 41.3 | 1889 | 52.3 | 82.5 | 1.609 | 0.63 |
| M-1: ENZ-Maize at 500 g/t | 41.3 | 1911 | 51.9 | 82.3 | 1.586 | 1.25 |
| M-1: ENZ-Maize at 1000 g/t | 41.3 | 1886 | 51.2 | 81.6 | 1.595 | 0.31 |
| W-0: wheat diet without additives | 41.3 | 1707 | 46.3 | 79.9 | 1.728 | 0 |
| W-1: ENZ-Wheat at 500 g/t | 41.3 | 1761 | 47.8 | 80.4 | 1.685 | 0.95 |
| W-1: ENZ-Wheat at 1000 g/t | 41.3 | 1850 | 50.2 | 80.8 | 1.609 | 0.94 |
| W-3: ENZ-Wheat at 500 g/t + Acid LAC at 3 kg/t | 41.3 | 1849 | 50.2 | 83.3 | 1.661 | 1.25 |
| Pooled std error | | 16.1 | 0.45 | 0.85 | 0.0126 | 0.43 |
| | | | P>T | | | |
| M-0 vs M-1 and M-2 | | 0.65 | 0.65 | 0.63 | 0.23 | 0.88 |
| M-1 vs M-2 | | 0.27 | 0.27 | 0.56 | 0.60 | 0.15 |
| W-0 vs W-1, W-2, and W-3 | | 0.0001 | 0.0001 | 0.12 | 0.0001 | 0.034 |
| W-1 vs W-2 | | 0.0003 | 0.0003 | 0.79 | 0.0001 | 0.99 |
| W-1 vs W-3 | | 0.0004 | 0.0004 | 0.023 | 0.19 | 0.35 |
| W-2 vs W-3 | | 0.95 | 0.95 | 0.043 | 0.005 | 0.34 |

[1]Values are means and standard errors of 8 replicates of 40 chickens per treatment Daily gain and feed conversion were in general better for the maize than for the wheat diets, as expected, although enzyme supplementation reduced the differences considerably.

Breast weight and percent breast are shown in Table 7. There were no significant differences in breast weight or breast yield in the maize diets (P>0.05). ENZ-Wheat at the high level, increased breast weight (P<0.05) with respect to the diets containing the low level. Acid LAC did not have any effect on breast weight or breast yield with respect to the diet containing the same level of ENZ-Wheat.

TABLE 7

Breast weight and percent breast

| Treatment | Breast Weight[1] | Percent Breast | Percent breast adjusted |
|---|---|---|---|
| M-0: maize diet without additives | 389 | 16.6 | 16.6 |
| M-1: ENZ-Maize at 500 g/t | 393 | 17.0 | 17.0 |
| M-1: ENZ-Maize at 1000 g/t | 392 | 16.7 | 16.7 |
| W-0: wheat diet without additives | 351 | 15.8 | 15.8 |
| W-1: ENZ-Wheat at 500 g/t | 349 | 15.6 | 15.7 |
| W-1: ENZ-Wheat at 1000 g/t | 379 | 16.1 | 16.1 |
| W-3: ENZ-Wheat at 500 g/t + Acid LAC at 3 kg/t | 353 | 16.1 | 16.1 |
| Pooled std error | 8.9 | 0.19 | 0.19 |
| M-0 vs M-1 and M-2 | 0.70 | 0.29 | 0.27 |
| M-1 vs M-2 | 0.98 | 0.22 | 0.16 |
| W-0 vs W-1, W-2, and W-3 | 0.33 | 0.62 | 0.70 |
| W-1 vs W-2 | 0.012 | 0.057 | 0.099 |
| W-1 vs W-3 | 0.74 | 0.39 | 0.36 |
| W-2 vs W-3 | 0.034 | 0.32 | 0.49 |

[1]Mean and standard error of 8 replicates of 4 chickens per treatment

Performance was in general better for the maize than for the wheat diets, but enzyme supplementation considerably reduced the differences.

Overall performance can be considered very good, especially in terms of mortality which was very low. Results of this experiment suggest that response to ENZ-Maize in maize diets is low and not significant, although there was a slight improvement in terms of feed conversion. However, the improvement was not in a dose response manner. In contrast, ENZ-Wheat caused a significant improvement in terms of daily gain and feed conversion in the wheat diets. The addition of Acid LAC caused a significant improvement in terms of weight gain with respect with the treatment containing the same level of enzyme without Acid LAC. However, the response obtained with the high level of ENZ-Wheat was greater in terms of feed efficiency than that obtained with the combination of ENZ-Wheat at low level and Acid LAC. Results of breast weight and breast yield suggested a positive effect of ENZ-Wheat on these parameters with respect to the negative control or the low level of ENZ-Wheat. Acid LAC had no significant effect on these parameters.

Conclusion

Results of this experiment suggest that the effect of ENZ-Maize on performance of chickens fed maize-based diets is rather small and non-significant. In contrast, ENZ-Wheat improves daily gain and feed efficiency of wheat-based diets in a dose response manner. Acid LAC improved daily gain with respect to the diet containing the same level of ENZ-Wheat, but did not significantly improve feed efficiency. The high level of ENZ-Wheat improved breast weight and breast yield with respect to the low level of ENZ-Wheat.

EXPERIMENT 3

Materials and Methods

As enzyme product we selected ENZ-Xylanase. The main enzymatic activity present in this product is xylanase. This enzyme catalyses the breakdown of wheat pentosans. By degrading this anti-nutritional factor more nutritional components of the feed will be made available. This would result in a lower gut viscosity and better litter quality.

Nine hundred male Ross broilers were divided over 30 floor pens for the first 14 days. After the starter phase 15 birds were put per pen. Each pen (0.8 square meter) contained one feeder in front of the pen and separately two drinking nipples in the backside of the pen. Feed and water were available ad libitum.

All birds received a commercial broiler starter feed from day 0 until 14 and a wheat based broiler finisher meal from day 14 until day 43, both derived from Joosen-Luyckx (Turnhout). The composition of the diets is shown in Tables 8 and 9. The broiler finisher meal is formulated at 97% of optimal composition concerning digestible amino acids and energy. The reason for this reformulation was to create a larger margin for a possible beneficial effect of a treatment to show.

Pens were assigned to one of five treatments (twelve replicate pens of 15 birds for each treatment) using a block randomization. The treatments consisted of:

Negative control

Control feed+ENZ-Xylanase at 1 Kg/ton

Control feed+ENZ-Xylanase+addition of S1 biosurfactant at 1 Kg/ton

Control feed+ENZ-Xylanase Lysoprin at 1 Kg/ton

Control feed+ENZ-Xylanase+addition of biosurfactant containing approx. 16 weight % Bolec MT at 1 Kg/ton.

In the broiler house the temperature program started on day 0 at 35° C. decreasing 0.5° C. every day and from day 28 onwards 22° C. Ceiling ventilation was done via Custers Air Control using Delta tubes situated under the air-inlets. The climate was semi-automated via Avecom 103 system. The light cycle was 3 hours dark and 1 hour light. All birds were weighed at days 0, 14 and 43. Feed usage was measured at days 14 and 43. Litter quality was observed at days 14, 35 and 43.

Live performance data were analyzed as a randomized block design with pen means as the statistical unit. Statistical analysis was performed with the SAS System for Windows, Release 6.12 TS level 0020, licensed to K. U. Leuven, Site 0004759002.

TABLE 8

Composition of Broiler Starter Meal

| Ingredients | | Analyses | |
|---|---|---|---|
| Mais yellow | 30.00 | Crude protein | 22.40 |
| Soya 49 | 23.70 | Fat | 8.03 |
| Soyax | — | Crude Fibre | 2.88 |
| Wheat | 28.30 | Ash | 5.68 |
| Animal meal (50/12) | 5.80 | Ca | 1.10 |
| Fat (pork, beef) | 5.00 | Available P | 0.47 |
| Fish meal | 2.00 | Dig. Lysine | 1.15 |
| Methionine and Lysine | | Dig. Met. + Cys. | 0.82 |
| Vitamins, Minerals, Coccidiostaticum | | ME (Kcal/Kg) | 2987 |

TABLE 9

Composition of Broiler Finisher Meal

| Ingredients | | Analyses | |
|---|---|---|---|
| Wheat | 57.93 | CP | 22.50 |
| Soya 49 | 16.49 | Fat | 8.97 |
| Soyax | 10.00 | Crude Fibre | 2.98 |
| Meat and bone meal 50/12 | 7.00 | Sugar & Starch | 40.91 |
| Animal fat | 4.95 | Ca | 1.00 |
| Vitamins, Minerals, | | Available P | 0.49 |
| Coccidiostaticum | | Linoleic acid | 1.84 |
| Methionine and Lysine | | Dig. Lysine | 1.04 |
| | | Dig. Met. + Cys. | 0.77 |
| | | Dig. Threonine | 0.64 |
| | | Dig. Tryptophan | 0.21 |
| | | ME (Kcal/Kg) poultry | 3169 |

Results and Discussion

There is no difference observed in litter quality between the treatments at all the observation dates. However, generally towards the end of the trial, litter seemed to be more wet in all groups compared to the situation at the start of the trial.

The effect of different treatments on chick performance is shown in Table 10. Although final weight, daily feed intake and daily growth do not statistically differ from each other we can observe a statistically significant difference in FCR between control group and group D and E. These groups do contain a lysophospholipids/phospholipids type of biosurfactant.

It seems that the presence of enzymes (in particular the xylanase) and their effect can be influenced in a positive way when they are combined with a biosurfactant. A certain level of the appropriate enzyme activity must be present in order to give this positive response. This can be observed in the numerical difference between group A and B.

TABLE 10

Average live weight (LW), daily feed intake (DFI), daily growth (DG) and feed conversion ratio (FCR) with their standard deviation of different treatment groups; values corrected for initial weight

| Group | A | B | C | D | E |
|---|---|---|---|---|---|
| FCR at d14 | 1.57 ± 0.02a | 1.57 ± 0.03ab | 1.58 ± 0.02ab | 1.64 ± 0.02b | 1.55 ± 0.02a |
| FCR at d43 | 1.65 ± 0.01b | 1.64 ± 0.01ab | 1.65 ± 0.01b | 1.63 ± 0.01a | 1.62 ± 0.01a |
| LW(g) at d0 | 43.1 ± 0.9 | 43.4 ± 0.5 | 43.1 ± 0.8 | 43.1 ± 0.8 | 43.0 ± 0.4 |
| LW(g) at d14 | 298 ± 4.3a | 300 ± 5.1a | 292 ± 4.4ab | 285 ± 4.3b | 293 ± 4.6ab |
| LW(g) at d43 | 2236 ± 25.8ab | 2276 ± 30.2a | 2189 ± 25.8b | 2211 ± 25.8ab | 2215 ± 27.4ab |
| DFI(g) at d14 | 28.6 ± 0.4 | 28.8 ± 0.5 | 28.0 ± 0.4 | 28.2 ± 0.4 | 27.7 ± 0.4 |
| DFI(g) at d43 | 84.1 ± 0.9ab | 85.2 ± 1.1a | 82.5 ± 0.9ab | 81.9 ± 0.9b | 82.1 ± 1.0b |
| DG(g) at d14 | 18.2 ± 0.3a | 18.3 ± 0.4a | 17.7 ± 0.3ab | 17.3 ± 0.3b | 27.7 ± 0.4 |
| DG(g) at d43 | 51.0 ± 0.6ab | 52.0 ± 0.7a | 49.9 ± 0.6b | 50.4 ± 0.6ab | 51.5 ± 0.6ab |

Treatment means within the same row not sharing a same letter differ statistically significant (P<0.05)

Some in vitro analyses were done on the broiler finisher feed, which was used in this trial.

In a modified incubation experiment the NDF fraction of the feed was directly placed in contact with the enzyme/biosurfactant combinations. Afterwards NDF % was measured again. Results are expressed in total breakdown percentage.

In Table 11 results of this experiment are shown. The group in which Lysoprin was used performed the best. However, no significant differences could be observed between this group and the groups when Bolec MT was used or when no biosurfactant was used.

Clearly there is a significant difference between the group of lecithin and the other biosurfactants.

The effect of significant differences between the biosurfactants is also observed in the in vivo experiment. This confirms earlier studies which showed a positive correlation between NDF degradation of broiler feeds which were used in animal trials and the results of the animal performances in those trials.

TABLE 11

NDF breakdown of broiler finisher feed used in trial in the presence of ENZ-Xylanase without or with addition of biosurfactant products.

| | NDF-breakdown % | N | Relative NDF-breakdown % |
|---|---|---|---|
| CONTROL | 8.10 +/− 0.08 | 2 | 100.00 |
| ENZ-Xylanase | 6.72 +/− 0.28 | 3 | 82.96 |
| CONTROL + S1 | 8.91 +/− 0.46 | 1 | 100.00 |
| ENZ-Xylanase + S1 | 8.14 +/− 0.12 | 3 | 91.36 |
| CONTROL + S2 | 8.91 +/− 0.46 | 1 | 100.00 |
| ENZ-Xylanase + S2 | 7.34 +/− 0.37 | 3 | 82.38 |
| CONTROL + S3 | 8.91 +/− 0.46 | 1 | 100.00 |
| ENZ-Xylanase + S3 | 7.54 +/− 0.28 | 3 | 84.62 |

Discussion

This study proves that biosurfactants such as Bolec MT and Lysoprin give significant differences compared to lecithin when used in combination with an enzyme product such as ENZ-Xylanase.

Although the invention has been described with respect to a preferred embodiment thereof, it is to be also understood that it is not to be so limited since changes and modifications can be made therein which are within the full intended scope of this invention as defined by the appended claims.

The invention claimed is:

1. A method for improving the degradation of the neutral detergent fiber in an animal feed with a combination of exogenous enzymes, comprising the step of adding an effective amount of a surfactant to an animal feed containing a combination of exogenous enzymes comprising xylanase, α-amylase, α-galactosidase, β-glucanase cellulase, lipase, and protease, wherein the surfactant is a lecithins composition enzymatically enriched in lysophospholipids to contain at least about 5% by weight of lysophospholipids to the amount of lysophospholipids plus phospholipids, to degrade the neutral detergent fiber in the animal feed.

2. The method as defined in claim 1, wherein said animal feed includes from between about 10 weight percent to about 55 weight percent of a small cereal grain.

3. The method as defined in claim 2, wherein said small cereal grain is selected from the group consisting of wheat and barley.

4. The method as defined in claim 3, wherein said enzyme is added to said animal feed in an amount to provide exogenous xylanase activity of between about 100 and about 50,000 units per kilogram of said animal feed.

5. The method as defined in claim 4, wherein said surfactant is included in an amount that is between about 0.025 and about 0.200 grams/kilogram of the animal feed.

6. The method as defined in claim 1, wherein said surfactant is included in an amount that comprises between about 0.025 and about 0.200 grams/kilogram of the animal feed.

7. The method as defined in claim 1, wherein the degradation of neutral detergent fiber is increased by at least at least about 50% over neutral detergent fiber degradation by the combination of exogenous enzyme without the surfactant.

8. The method as defined in claim 1, wherein the protease is added in an amount between about 0.1% and about 1% by weight of the other exogenous enzymes and surfactant.

9. A method of reducing the amount of exogenous enzyme required to achieve a preselected level of degradation of neutral detergent fiber in an animal feed, comprising the step of adding an effective amount of a surfactant to an animal feed containing a combination of exogenous enzymes comprising $\alpha$-amylase, $\alpha$-galactosidase, $\beta$-glucanase, cellulase, lipase and xylanase; a protease; wherein the surfactant is a lecithins composition enzymatiacally enriched in lysophospholipids to contain at least about 5% by weight of lysophospholipids to the amount of lysophospholipids plus phospholipids, and wherein the amount of the exogenous enzyme is reduced by up to about 50% without a reduction in degradation of neutral detergent fiber.

* * * * *